Dec. 7, 1943.   J. O. YEIDA   2,335,985
HOSE CLAMP
Filed Aug. 17, 1942
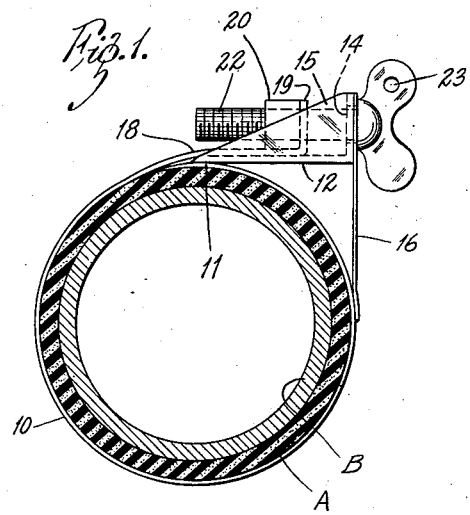
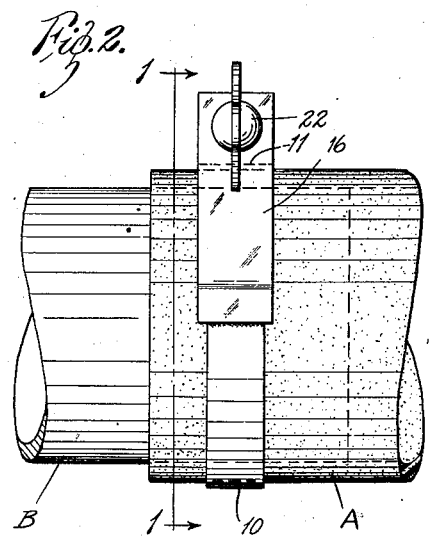
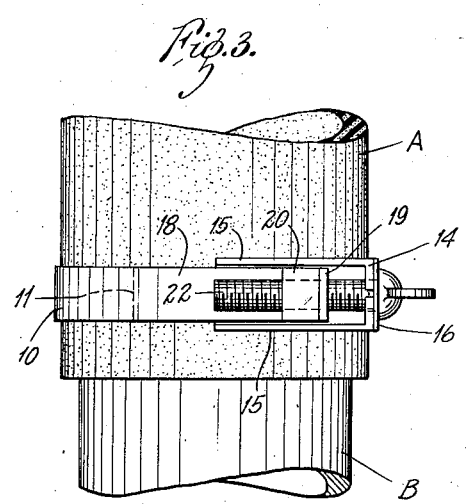
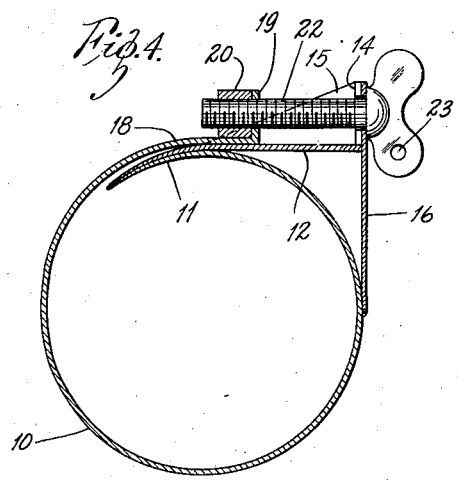
INVENTOR:
JOHN O. YEIDA,
By Kingsland, Rogers Ezell
ATTORNEYS.

Patented Dec. 7, 1943

2,335,985

UNITED STATES PATENT OFFICE 2,335,985

HOSE CLAMP

John O. Yeida, Herculaneum, Mo., assignor to Automatic Control Corporation, St. Louis, Mo., a corporation of Delaware Application August 17, 1942, Serial No. 455,134

4 Claims. (Cl. 24—19)

This invention relates to hose clamps, and more particularly to that type of hose clamp having a continuous metal band designed to wrap around the hose, the inner end being in sliding contact with the inner surface of the rest of the band.

The circumference of the band is reduced to cause the band to have a clamping action upon the hose by means of a plurality of members, two of which members project from positions substantially tangent to the band, said members meeting at substantially a right angle outside the circle, the member projecting from the innermost portion of the band being formed into a right angle to lie adjacent to the face of the other member.

A third of these members is a continuation of the circular band which lies over the inner portion of the band and is designed upon tightening to travel in the general direction of the first of these members.

An object of the invention is to provide a clamp that remains substantially circular throughout a range of clamping positions. Specifically, an object is to assist in accomplishing this by providing one of the tangential members relatively stiff, and the other somewhat flexible.

A further object is to provide means to maintain the overlapping ends of the clamp aligned.

A further object of the invention is the provision of a clamp that will fasten a hose section in position without buckling the same.

A further object of the invention is the provision of a clamp that can be installed easily and quickly.

In the drawing:

Fig. 1 is a detailed end view of the clamp in position on a hose section taken on the line 1—1 of Fig. 2;

Fig. 2 is a side view of the same;

Fig. 3 is a top view of the same; and

Fig. 4 is a sectional view illustrating the clamp in spread or distended condition.

Referring to the drawing, there is a circular band 10 which is designed to engage the surface of a hose section with substantially equal pressure at all points, so as to maintain in itself and in the hose section at all times a substantially circular shape.

The band 10 includes an inner end 11 from which a member 12 projects substantially tangentially to the band 10. This member has two flanges 15 turned up along its edges, and the extremities of the flanges are turned inwardly to lie at right angles to the strip 12, forming an end portion 14.

A flexible strip 16 is attached to the band 10 at a point roughly 90° from the attachment of the member 12 to the band. It extends to lie alongside the end 14. The member 16 is given flexibility to insure the maintenance of true circularity throughout the band 10 at all times, and to avoid distortion of the end 14 relative to the strip 12.

The band 10 has a portion 18 overlapping the inner end 11 and the strip 12. This portion 18 lies within the channel provided between the flanges 15 and is maintained in alignment thereby. The portion 18 is turned up at 19 to provide an ear opposite the portion 14, and this may be reinforced by a block 20.

The upper and adjacent ends of the portion 14 and the strip 16 are pierced by holes to receive a wing screw 22. The ear 19, and the block 20 have a threaded opening to receive the screw 22. The handle of the screw has a hole 23 in it to receive a locking wire or the like, that may be wrapped around any convenient stationary part.

The operation of the device is as follows:

It may be assumed that the band 10 is passed over the end of a hose section A and then the hose section A is fitted over a fitting B to which it is to be secured. It may be desirable to coat the part of the hose section A beneath the band with some antifriction material such as soap to assist in preventing the clamping device from binding into the rubber or like material of the hose section. However, the necessity of using such antifriction material is minimized with the present clamp.

If it is impractical to fit the clamp into position as indicated above, the screw 22 may be completely withdrawn, the ends 11 and 18 of the band 10 separated, the clamp passed completely around the hose, and the screw 22 again passed through the opposed clamping ears. It is then necessary only to draw the screw tight to cause a complete clamping and binding.

In the operation of tightening the band, the inner projection 11 of the band may be assumed as the starting point of a wrapping action. Thus assumption means that the portion 14 will be relatively fixed in position, and the angular relationship of the portion 14 to the strip 12 maintained by the flanges 15.

The screw 22 draws the ear 19 toward the portion 14 and in so doing, the ear 19 and the end 18 of the band are held in alignment with the end 11 of the band by the flanges 15.

It will be seen that the end 11 tapers down to a relatively thin edge to reduce the piling up of rubber at that point during the tightening operation.

The member 16 is flexible so that the reduction in diameter of the device may be substantially equal all around. However, the band 16 maintains the strip 12 substantially tangential to the circle of the band so that the tightening force is exerted in such tangential direction, which is the direction of ideal wrapping and minimum distortion. The flexibility of the band 16 does permit the main body of this band to deflect from an angle of exactly 90° to the strip 12 and thereby permits even the portion of the band between the end 11 and the junction of the strip 16 to conform to the screw of the hose. It also permits the portion of the band 16 that overlaps the portion 14 to remain contiguous thereto throughout the extent of the portion 14.

To illustrate the desirable uniformity of compression around the band of the present clamp, it may be observed that if it is drawn down onto a free hose, it will collapse the same in substantially circular condition.

It will be observed that the band 10 is of sufficient resiliency to follow the curvature of the hose and to bring the portion 11 against the overlying part of the main band itself. The end 11 projects beyond the point of tangency of the outer portion 18 of the band so that the tightening forces of the wrapping action occasioned by the tangentially applied force will be distributed better over the band, thus the tightening force is not applied right at the point of tangency where it might result in an excess centripetal component.

What is claimed is:

1. In a clamp, a substantially circular overlapping band, the outer portion of said band being continued as an arm tangentially from the circular portion thereof, an upstanding ear at the end thereof, a block adjacent to said ear, a second arm extending tangentially from the inner end of said band and substantially parallel to the first arm, an upstanding ear at the end of said arm, flanges extending from said ear to the point of tangency, a third arm extending from a position adjacent to the last mentioned ear to a position tangent to the circular portion of said band, said arm being flexible, and a means for drawing said ears toward each other.

2. In a device of the kind described, a flexible band adapted to be formed into a circle with one end overlapping the other, a member extending tangentially backward from the inner end beneath the overlapping outer end, means to draw the overlapping outer end along the tangential member to reduce the size of the circle, and flexible means attaching the backward end of the tangential member to the band at a point spaced from said inner end.

3. In a device of the kind described, a flexible band adapted to be formed into a circle with an outer end overlapping an inner end, a stiff member extending backward from a point spaced backwardly from the inner end of the band, and underlying the outer end of the band, a flexible member connecting the stiff member with the band to prevent outward displacement of the end of the stiff member relative to the center of the band, means connecting the stiff member and the overlapping outer end of the band to draw the said outer end along the stiff member and reduce the size of the circle of the band.

4. In a device of the kind described, a flexible band adapted to be formed into a circle with an outer end overlapping an inner end, a strip attached to the inner end and extending backwardly relative thereto, means attaching the outer end of the strip to the band, sides extending upwardly from the strip to stiffen the same, and forming a guiding channel, the outer end of the band extending into the channel and movable therealong to vary the diameter of the band, and means to draw said outer end of the band toward the outer end of the strip.

JOHN O. YEIDA.